Sept. 6, 1966  B. P. GURULE  3,270,446
ANIMATED DISPLAY DEVICE
Filed Dec. 23, 1963  6 Sheets-Sheet 1
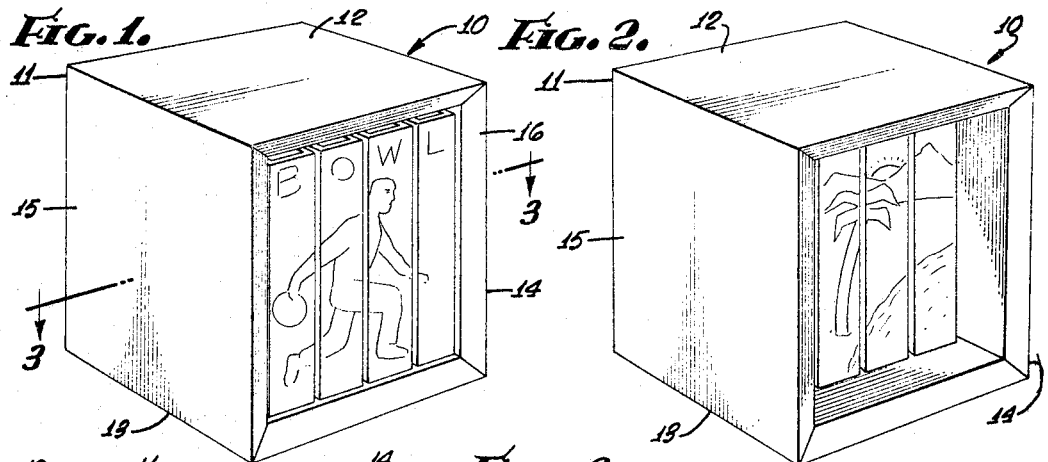
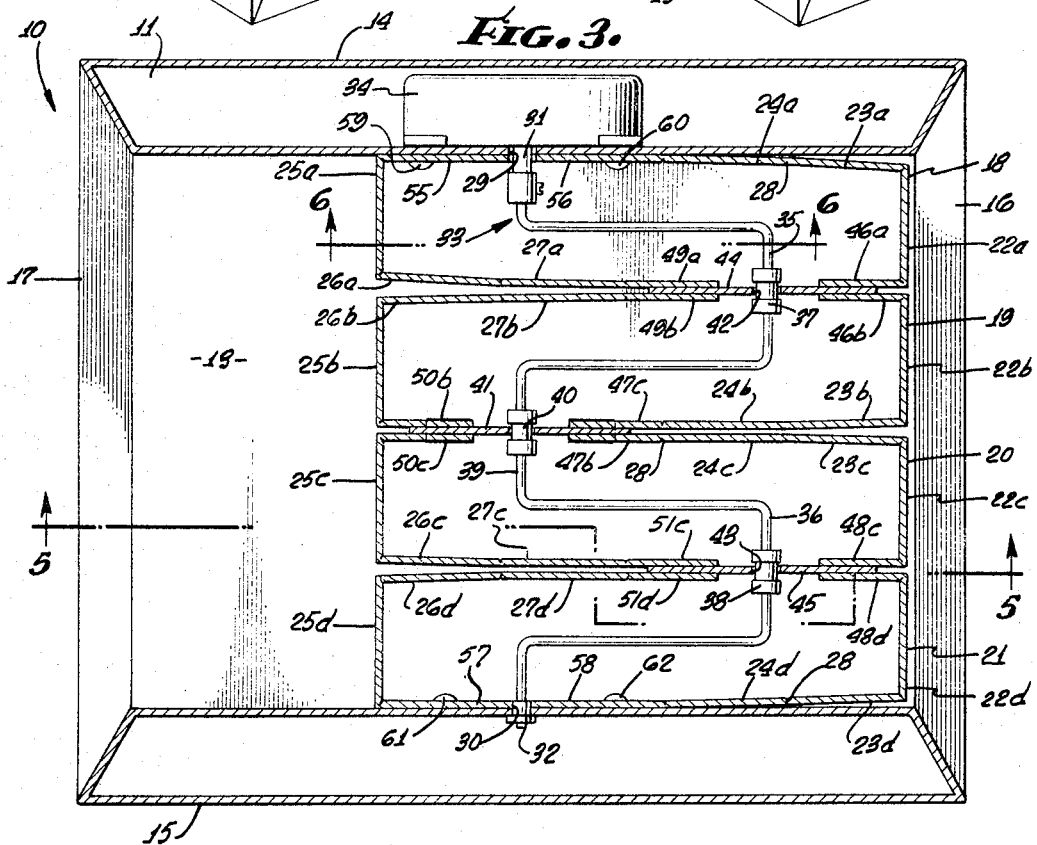
INVENTOR.
BENJAMIN P. GURULE
BY
Huebner & Worrel
ATTORNEYS.

Sept. 6, 1966  B. P. GURULE  3,270,446
ANIMATED DISPLAY DEVICE
Filed Dec. 23, 1963  6 Sheets-Sheet 2

INVENTOR.
BENJAMIN P. GURULE
BY Huebner & Worrel
ATTORNEYS.

Sept. 6, 1966  B. P. GURULE  3,270,446
ANIMATED DISPLAY DEVICE
Filed Dec. 23, 1963  6 Sheets-Sheet 3
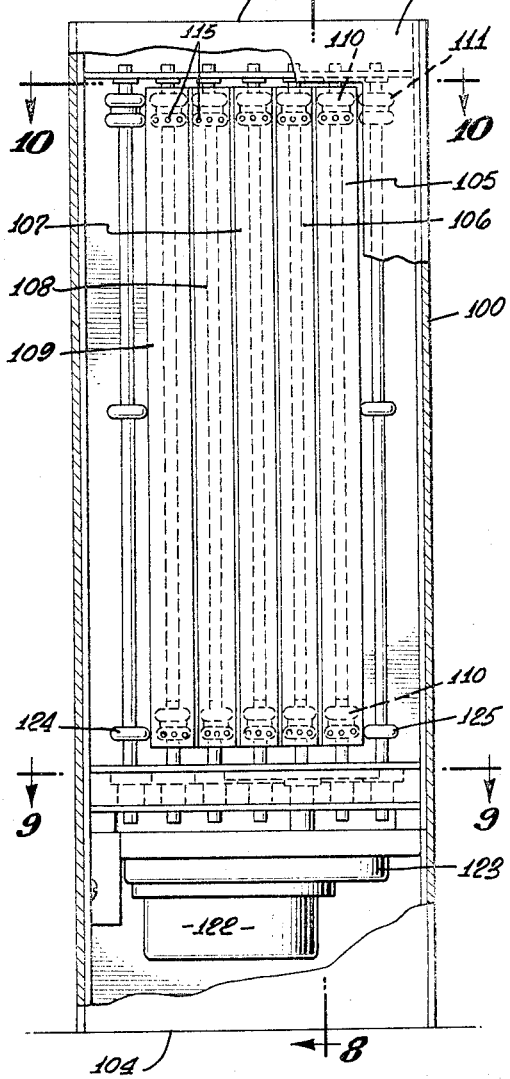
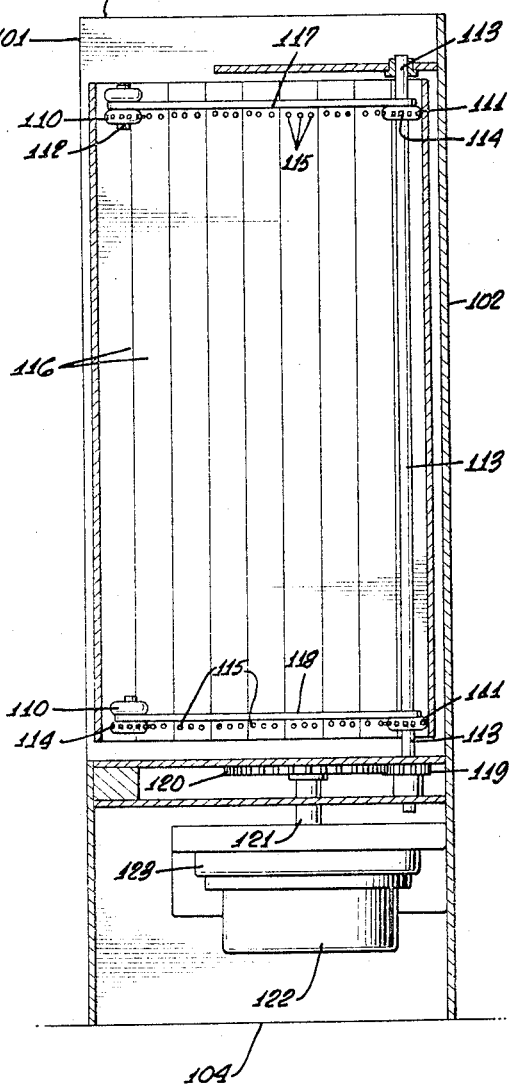
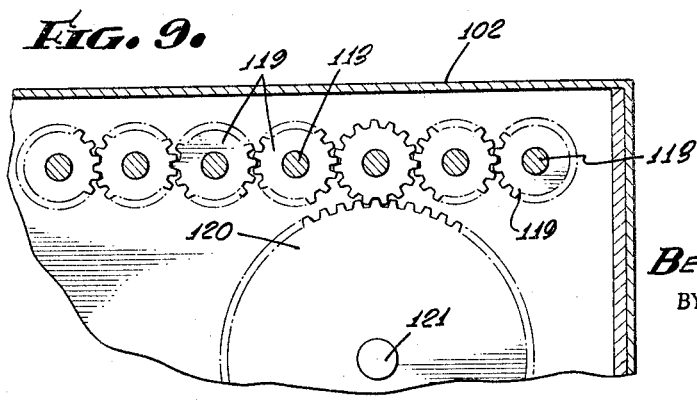
INVENTOR.
BENJAMIN P. GURULE
BY Huebner & Worrel
ATTORNEYS.

Sept. 6, 1966 B. P. GURULE 3,270,446
ANIMATED DISPLAY DEVICE
Filed Dec. 23, 1963 6 Sheets-Sheet 4
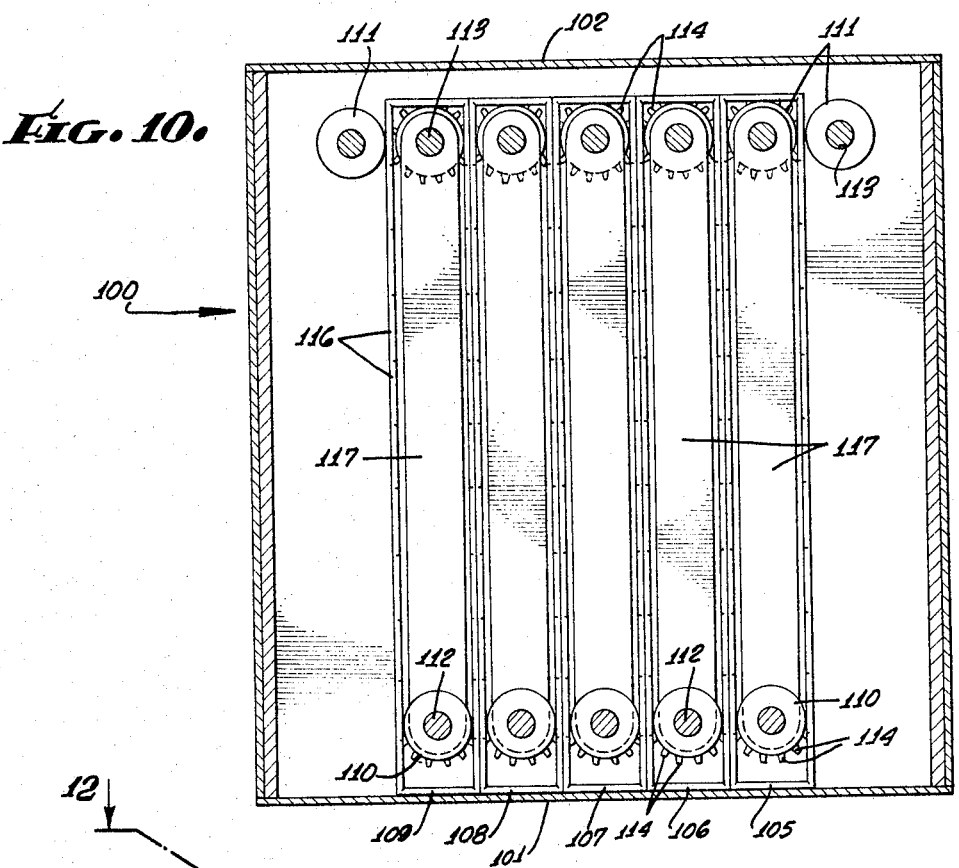
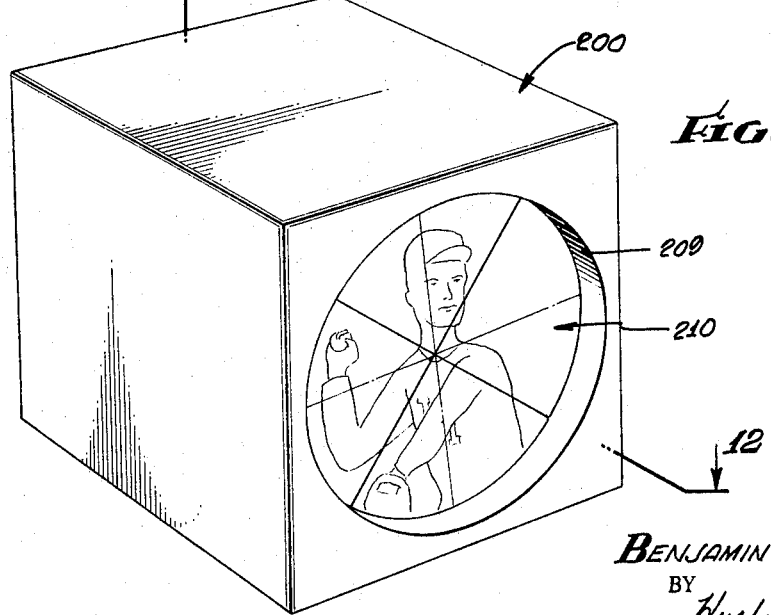
INVENTOR.
BENJAMIN P. GURULE
BY
Huebner & Worrel
ATTORNEYS.

Sept. 6, 1966  B. P. GURULE  3,270,446
ANIMATED DISPLAY DEVICE
Filed Dec. 23, 1963  6 Sheets-Sheet 5
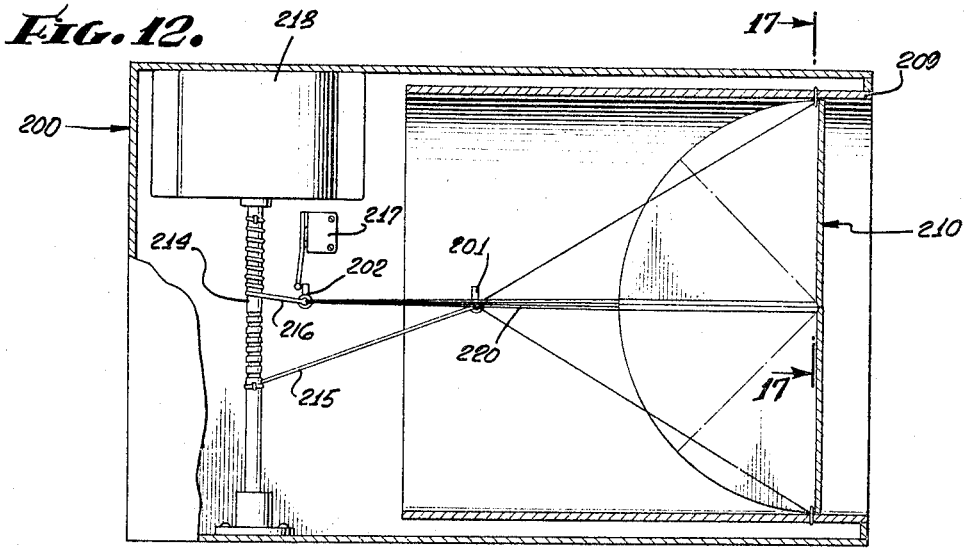
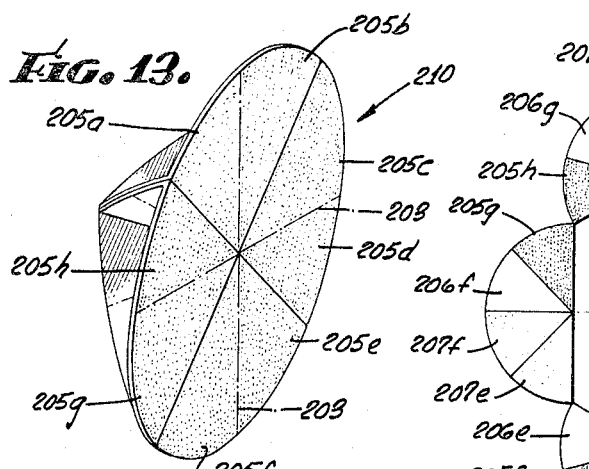
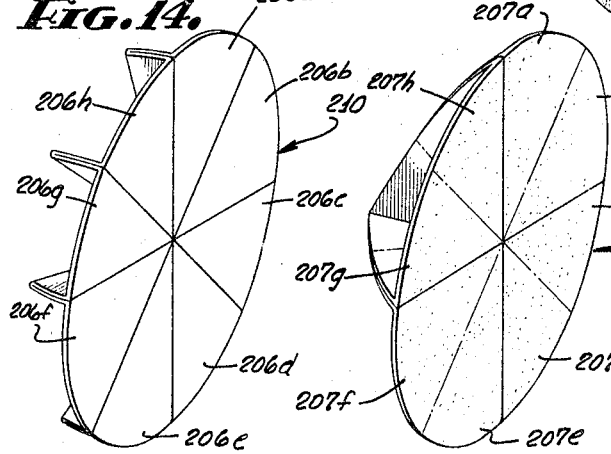
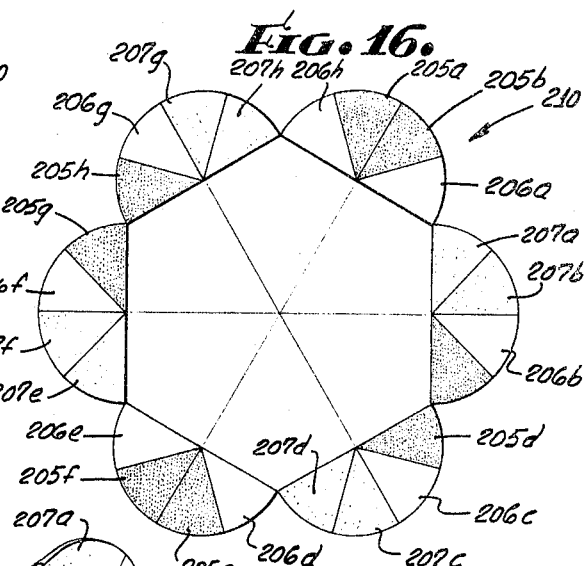
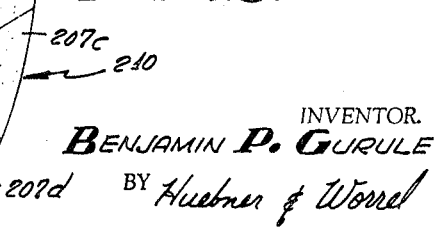
INVENTOR.
BENJAMIN P. GURULE
BY Huebner & Worrel
ATTORNEYS.

Sept. 6, 1966 B. P. GURULE 3,270,446
ANIMATED DISPLAY DEVICE
Filed Dec. 23, 1963 6 Sheets-Sheet 6
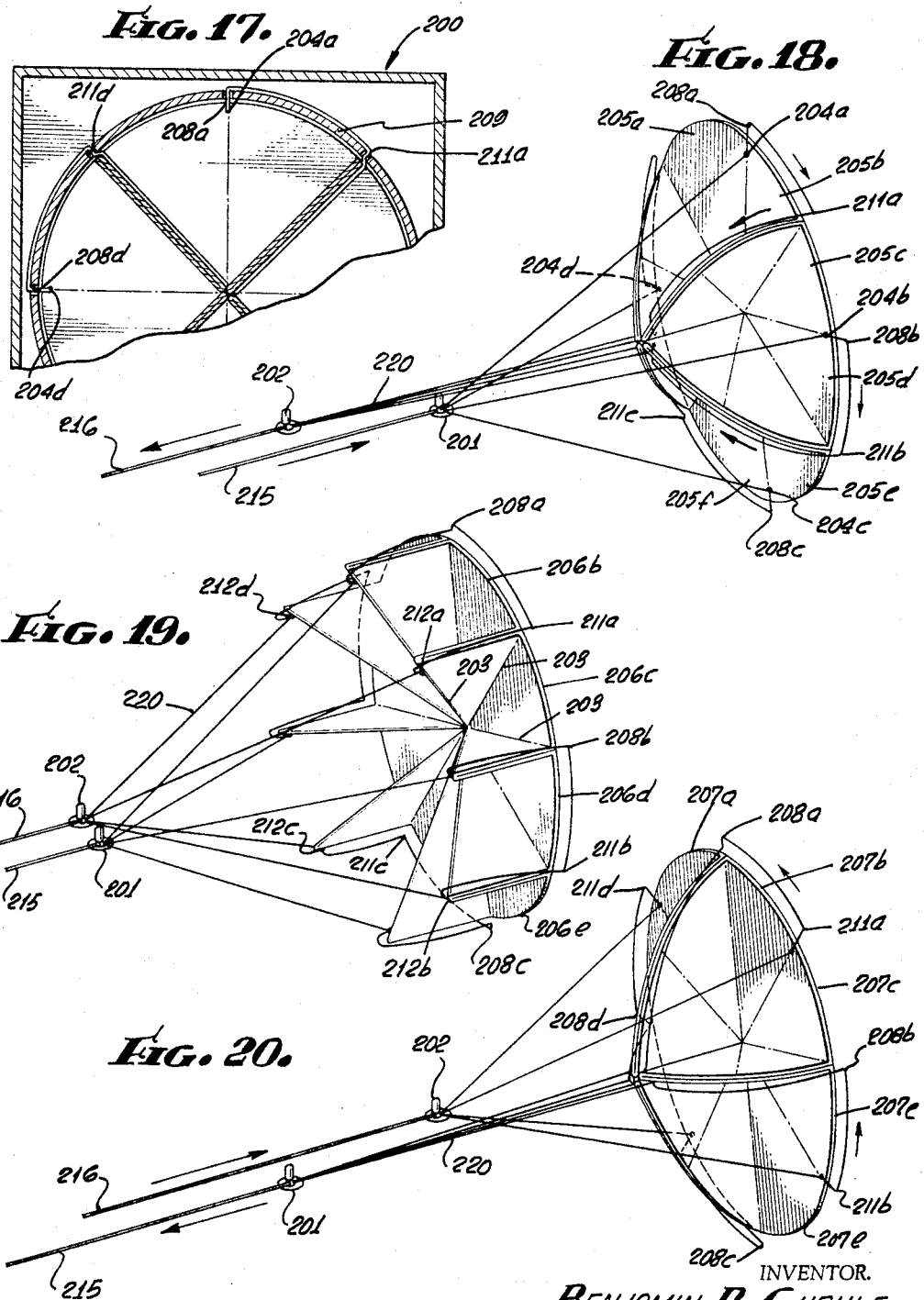
INVENTOR.
BENJAMIN P. GURULE
BY
Huebner & Worrel
ATTORNEYS.

United States Patent Office 3,270,446
Patented Sept. 6, 1966

3,270,446
ANIMATED DISPLAY DEVICE
Benjamin P. Gurule, 3055 S. Union Ave.,
Los Angeles, Calif.
Filed Dec. 23, 1963, Ser. No. 332,421
4 Claims. (Cl. 40—36)

This invention relates to an animated display device for presenting a series of independent visual displays. More particularly this invention relates to a display device which is capable of presenting a multiplicity of visual displays in a continuous sequence and in which each display may or may not be related with each of the other displays, the time duration for each display being automatically controlled and the entire sequence of operation for the device being controlled so that the visual displays are presented in a repetitious predetermined sequence.

It has long been recognized that a visual presentation of subject matter provides one of the most effective mediums for producing a lasting impression on viewers as to meaning, beauty, value or significance of the subject matter so presented. Animated visual displays have been found to be exceptionally effective when used by the advertising profession. It has been found that animated visual displays produce particularly good results in making public presentations for commercial items. Also, members of the education profession have long recognized the value of visual displays as teaching aids and in recent times considerable emphasis has been placed upon visual and audio-visual presentations for advancing the teaching and learning process. Teaching machines which present a sequence of visual displays have often been considered one of the most effective tools used by the teaching profession.

Accordingly it is an important object of this invention to provide an animated display device which presents a multiplicity of visual displays in a continuous sequence and in which each display may or may not be related with each of the other displays, wherein the entire sequence of operations for the display device is controlled so that each visual display is presented in a predetermined sequence.

Another object of this invention is to provide an animated display device which presents a multiplicity of visual displays in a continuous sequence and in which the time duration for presenting each visual display is automatically controlled in accordance with a predetermined time established for the presentation of each visual display.

Another object of this invention is to provide an animated display device which is simply constructed and which is capable of presenting a series of individual unrelated or related pictures at any desired time sequence and which is capable of automatically continuing the visual displays for any desired length of time without the intervention of further outside control.

That these and other objects and advantages of the invention are attained will be readily apparent from a consideration of the following description when taken in conjunction with the drawings in which:

FIGURE 1 is a perspective view of one embodiment of the animated display device of this invention.

FIGURE 2 is a perspective view of the same embodiment of the animated display device as shown in FIGURE 1, FIGURE 2 showing an alternate and unrelated visual display as compared to the display of FIGURE 1.

FIGURE 3 is a sectional view of the animated display device taken along line 3—3 of FIGURE 1 looking in the direction of the arrows on line 3—3.

FIGURE 4 is a top view of a portion of the display device shown in FIGURE 1 showing the sequence of positions for one loop of display panels within the display device.

FIGURE 7 is a front sectional view of an alternate embodiment of the animated display device.

FIGURE 8 is a sectional view taken along line 8—8 of FIGURE 7.

FIGURE 9 is a sectional view taken along line 9—9 of FIGURE 7.

FIGURE 10 is a top sectional view taken along line 10—10 of FIGURE 7.

FIGURE 11 is a perspective view of still another embodiment of the animated display device of this invention.

FIGURE 12 is a sectional view taken along line 12—12 of FIGURE 11.

FIGURES 13, 14 and 15 show three sequential positions for visual presentations made by the display device as shown in FIGURE 11.

FIGURE 16 is a front view showing the separated sectors of the visual displays prior to their being assembled in the device shown in FIGURE 11.

FIGURE 17 is a front view partly broken away of the display device as shown in FIGURE 11, showing some of the connecting linkages used for moving the display.

FIGURES 18, 19 and 20 show details of the linkage used for moving the display device as shown in FIGURE 11, each figure showing a different position corresponding to the three displays shown by the device of FIGURE 11.

Figure 5:
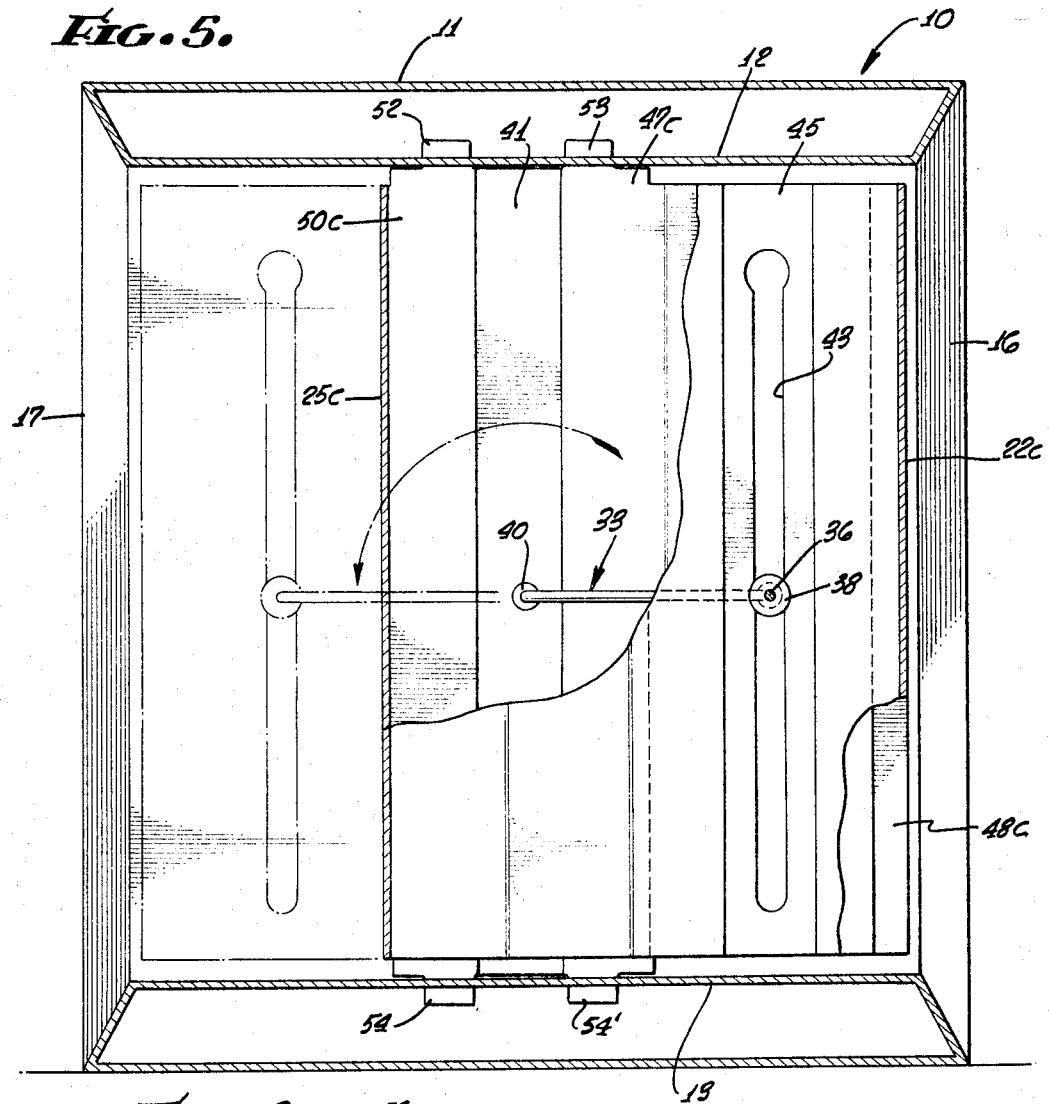
FIGURE 5 is a sectional view taken along line 5—5 of FIGURE 3 looking in the direction of the arrows on line 5—5.
Figure 6:
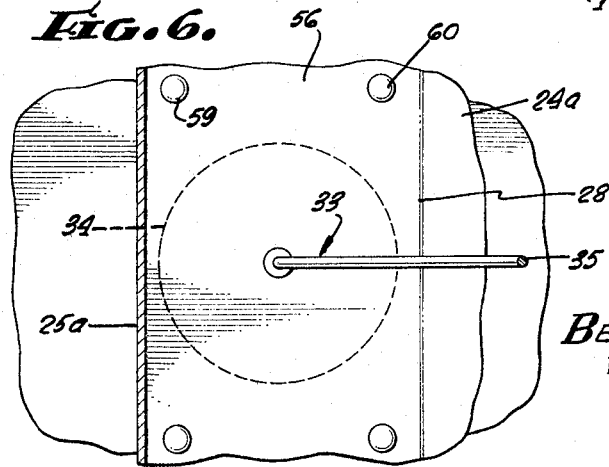
FIGURE 6 is a sectional view with partly broken away portions taken along the line 6—6 of FIGURE 3 looking in the direction of the arrows on line 6—6.

Referring to the drawings it can be seen that FIGURES 1 and 2 show two variations of visual displays which may be presented by the display device of this invention. FIGURES 1 and 2 show that the animated display device, generally designated by the numeral 10, is enclosed within a cabinet 11 having four sides, a top side 12, a bottom side 13, a right side 14 and a left side 15. The forward end 16 of the cabinet 11 as viewed to the right in FIGURE 3 is open. Similarly the rearward end 17 of the cabinet 11 as viewed to the left in FIGURE 3 is open. For purposes of illustrating this invention four panel loops 18, 19, 20 and 21 with each panel loop having six panels and therefore six variations of visual displays have been shown. As best shown in FIGURE 3, there may be three variations of visual displays seen through the open forward end 16 of the cabinet 11, and three variations of visual displays seen through the open rearward end 17 of the cabinet 11. The panel loop 18 is provided with six panels, three panels 22a, 23a and 24a showing through the forward end 16 of the cabinet 11 and three panels 25a, 26a and 27a showing through the rearward end 17 of the cabinet 11. In like manner panel loop 19 is provided with six panels, panels 22b, 23b and 24b showing through the forward end 16 of the cabinet 11 and panels 25b, 26b and 27b showing through the rearward end 17 of the cabinet 11. Similarly panel loop 20 is provided with panels 22c, 23c, 24c, 25c, 26c and 27c and panel loop 21 is provided with panels, 22d, 23d, 24d, 25d, 26d and 27d. Each panel is flexibly hinged by flexible hinging structure 28 to its adjacent panel so that as the display panel loops are moved forward and then rearward within the cabinet 11, in a manner to be more fully described hereinbelow, the corresponding panels 22a, 22b, 22c and 22d, for example, come into a coplanar aligned relationship. A portion of a complete visual display is depicted on each of the corresponding panels. Thus, for example, when the panels 22a, 22b, 22c and 22d of the panel loops 18, 19, 20 and 21, respectively, are in registering coplanar relationship, a complete visual display is presented since a portion of this display is depicted on each of the coplanar panels. Similarly, when the remaining corresponding panels on each of the four panel loops, both forward and rearward facing panels, are positioned in a registering coplanar relationship, a new and different visual display is thereby presented.

It is to be understood to be within the scope of this invention to provide as many panel loops having as many panels as desired in order to present the various visual displays capable of being presented by the animated display device of this invention.

The cabinet 11 which provides the encasing structure for the animated display device is provided with recesses 29 and 30 in the right side 14 and in the left side 15, respectively. Bearings 31 and 32 are positioned within the recesses 29 and 30, respectively, for receiving the journal ends of the crank shaft 33. The crank shaft is mechanically linked with a motor 34 and the motor 34 is properly adjusted and controlled so as to drive the crank shaft at some predetermined speed. The crank shaft is a single continuous unitary member formed to include a pair of crank arms 35 and 36 with bearings 37 and 38, respectively, positioned thereon. The crank shaft has a central section 39 which is rotatable in a bearing 40. The bearing 40 is mounted in a stationary partition 41 which is attached to both the display panel loops 19 and 20.

Referring to FIGURES 3 and 5 of the drawings, it can be seen that the rotary motion of crank shaft 33 translates into a linear motion for moving the display panel loops 18, 19, 20 and 21 in a forward and rearward direction within the cabinet 11. The bearings 37 and 38 on the crank shaft are free to travel vertically within the slots 42 and 43 in partition members 44 and 45, respectively. Partition members 44 and 45 form a partition between panels 19 and 20 and between panels 20 and 21, respectively. The partition members 44 and 45 provide structure for uniting the panel loops 18 and 19 and the panel loops 20 and 21 respectively. The forward end of partition member 44 is attached to the panels 46a and 46b of panel loops 18 and 19, respectively. The rear end of partition member 44 is attached to the panels 49a and 49b of the panel loops 18 and 19, respectively. Similarly the forward end of partition member 45 is attached to the panels 48c and 48d and the rear end of partition member 45 is attached to panels 51c and 51d of the panel loops 20 and 21, respectively, None of the panels 46a, 46b, 49a, 49b, 48c, 48d, 51c or 51d constitute display panels within the panel loops 18, 19, 20 or 21 but instead constitute structure which unites the panel loops 18 and 19 with partition member 44 and the panel loops 20 and 21 with partition member 45 and thus provide structure which facilitates the translation of the crank shaft rotary motion into linear motion for the panel loops 18, 19, 20 and 21.

Panel loops 19 and 20 are similarly connected to a partition member 41. The forward end of partition member 41 is attached to panels 47b and 47c and the rear end of partition member 41 is attached to panels 50b and 50c of the panel loops 19 and 20, respectively. None of the panels 47b, 47c, 50b or 50c constitute display panels within the panel loops but instead constitute structural members which unite the panel loops 19 and 20 with the partition member 41. The partition member 41 is a stationary member and is positioned within the cabinet 11 by means of connecting tabs 52, 53, 54 and 54' which are firmly secured within the top side 12 and bottom side 13 of the cabinet 11 by any well known securing method such as by tongue and groove construction, hard setting epoxy cement and the like. Thus it can be seen that partition member 41 does not move from its installed position within the cabinet 11. Similarly panels 55 and 56 and panels 57 and 58 are stationary within the cabinet 11. The panels 55 and 56 are attached to the right side of the cabinet at points 59 and 60 and the panels 57 and 58 are attached to the left side of the cabinet at points 61 and 62 by any well known attaching structure such as bolts, screws and the like.

As the crank shaft rotates in a counterclockwise direction, as shown by the arrow in FIGURE 5, a force is applied to the panels 44 and 45. The panels are thus moved from the forward part of the cabinet, as seen to the right in FIGURE 5, to the rearward part of the cabinet, as seen to the left of FIGURE 5. Since each of the panels of each panel loop is hinged by hinging structure 28, the lateral movement of the panels 44 and 45 will cause the display panels to change their positions, as best shown in FIGURE 4 of the drawings. As can be seen from FIGURE 4, as the successive panels are brought into registering coplanar relationship, the successive visual displays presented by the panels will be positioned at different planar positions within the cabinet.

Motor 34 drives crank shaft 33 at the same predetermined established speed. Motor 34 can be adjusted to operate at a desired speed or alternatively, a conventional circuit breaker mechanism may be provided so as to turn the motor on and off at predetermined established intervals in order to regulate the length of time that each panel of the display panel loops will be exposed to the forward and rearward ends of the cabinet 11.

The form of the invention shown in FIGURES 7 through 10 employs a multiplicity of panel loops which do not oscillate or reciprocate but which move in a continuous motion from one visual display to the next until the original picture reappears at the front of the cabinet. This embodiment of the animated display device includes a cabinet 100. Cabinet 100 has a front wall 101 with a large opening therein for viewing the various visual displays presented by the display device. Cabinet 100 has a solid back wall 102, a top side 103 and a bottom side 104. In the embodiment of the invention as seen in FIGURES 7–10 five panel loops have been shown. These loops are generally designated 105, 106, 107, 108 and 109. Although for purposes of illustrating this invention five loops have been shown, it is to be understood to be within the scope of this invention to provide various numbers of loops in order to present the various types of visual displays which may be presented by this form of the animated display device. The panel loops 105, 106, 107, 108 and 109 are mounted on forward rollers 110 and rear rollers 111 which are in turn mounted on shaft members 112 and 113 respectively. The rollers 110 and 111 are provided with teeth-like extensions 114. These teeth-like extensions engage corresponding slots 115 in the panel loops mounted on the rollers and thereby insure that a proper alignment will be continuously maintained between the corresponding panels of the panel loops, and also thereby transmit a propelling force to the panel loops so as to move the loops between the forward rollers and the rear rollers.

Referring to FIGURE 8, it can be seen that each panel loop includes a plurality of panels 116. Each panel has a portion of a complete visual display depicted thereon. When the corresponding panels in each loop come into a registering coplanar aligned relationship, facing toward the open front end of the cabinet, a complete picture is thereby displayed. A different visual display will be presented when the remaining corresponding panels within each panel loop come into a registering coplanar relationship facing the open front end of the cabinet.

In FIGURE 8 it can be seen that pulley belts 117 and 118 have been provided for connecting the forward rollers with the rear rollers. The forward rollers are idler rollers and thus by connecting the rear rollers with the forward rollers by means of the pulley belts, a positive motion is thereby imparted to the forward rollers. The forward rollers may or may not be provided with teeth-like extensions as provided on the rear rollers.

Referring to FIGURE 9 it can be seen that each rear shaft 113 is provided on its lowermost extremity with a gear member 119. Each gear member 119 on each rear shaft intermeshes with its adjacent gear members. The gear members 119 are driven by a main gear member 120 which in turn is driven by a shaft 121. A motor 122 drives shaft 121 through reduction gears 123. Since adjacent intermeshing gear members will of necessity turn in opposite directions, the adjacently disposed panel loops will be driven in opposite directions. However, adjacent portions of the loops will move in the same direction. For example, the adjacently disposed panels of the panel loops mounted on one pair of adjacent rollers will move in one direction simultaneously while the panels of these same panel loops which are not so adjacently disposed will move in an opposite direction. Since all of the rollers are driven by a motor 122, through reduction gears 123, shaft 121, main gear member 120 and adjacently disposed intermeshing gear members 119, all of the rollers thereby will be driven at a synchronous speed. Outside rollers 124 and 125 are provided so as to exert an inward force against the panel loops and thereby insure that the outermost loops 105 and 109 will maintain a proper alignment and will follow the rotational movement of the forward and rear rollers.

FIGURES 11 through 20 show a third form for the animated display device of this invention. Referring to FIGURE 11, it is seen that this form of the display device adapts itself to a circular display picture which is viewed through the open forward end on a cabinet 200. The device, as can be seen in FIGURES 12 and 17–20, is manipulated by a series of lines 220, or equivalent connecting members, which are attached to line securing member 201 at one of their ends, then are attached to the flexible hinging structure 203 which connects the various panel sectors of the display member 210, and then are attached to line securing member 202 at their other end in a manner to be more fully explained hereinbelow.

Referring to FIGURES 11 and 13–16, it is seen that one visual display presented by this display device is made up of eight panel sectors. These eight panel sectors are brought into a coplanar aligned relationship by movement of the line securing members 201 and 202 and the lines connected thereto.

The lines attached to the line securing member 201 are connected to the display member 210 at four points 204a, 204b, 204c and 204d. These lines are connected to the flexible hinging structure 203, at the points 204a, 204b, 204c, 204d, between the following pairs of sectors: 205a–205b, 205c–205d, 205e–205f, and 205g–205h. The lines connected to the display member 210 at the points 204a, 204b, 204c and 204d are led forward through apertures 208a, 208b, 208c and 208d in the forward portion of the cylindrical support structure 209 in which display member 210 is mounted. These lines are then led over an arc on the outer surface of the cylindrical support structure. The length of the arc is approximately equal to the arc of one panel sector on the display member 210. At the end of this arc the lines are led through apertures 211a, 211b, 211c, and 211d in the forward portion of the cylindrical support structure 209. These lines are then connected to the display member 210 at four points, the lines being connected to the flexible hinging structure 203 at the points 212a, 212b, 212c and 212d between the following pairs of sectors: 207a–207b, 207c–207d, 207e–207f, and 207g–207h. From the points 212a, 212b, 212c and 212d the lines are then led to the line securing member 202.

Since each panel sector of the display member 210 is flexibly hinged to its adjacent panel sector by flexible hinging structure 203, the various sectors of the display member 210 will change their position in accordance with the movement of the securing members 201 and 202.

Thus when the securing member 202 is pulled to its rearmost position, as seen in FIGURE 18, the panel sectors 207a through 207h will be pulled to their rearmost position. Since the lines attached to securing member 201 are then in a forward position, the panel sectors 205a through 205h will be positioned in a registering coplanar aligned relationship so as to present the first of three possible visual displays which may be presented by this form of the display device.

When the securing members 201 and 202 are positioned so as to be juxtaposed, as seen in FIGURE 19, the panel sectors 206a through 206h will be positioned in a registering coplanar aligned relationship so as to present the second visual display for this form of the display device. When the securing member 201 is moved to a rearward position, as shown in FIGURE 20, the panel sectors 207a through 207h will be moved into a registering coplanar aligned relationship so as to present the third visual display for this form of the display device.

It is to be noted that the visual display as shown in FIGURE 18 corresponds with that shown by FIGURE 13. Similarly the display of FIGURE 19 corresponds with that of FIGURE 14 and the display of FIGURE 20 corresponds with that of FIGURE 15.

The line securing members 201 and 202 may be moved in various manners and by various mechanisms. One particularly effective moving mechanism is shown in FIGURE 12 wherein a motor 213 drives a shaft 214. A line 215 is connected to the securing member 201 and a line 216 is connected to the securing member 202. The line 215 is attached to the lower part of the shaft 214 and is wound around the shaft 214 as the shaft is turned in a counterclockwise direction. The line 216 is attached to the upper part of the shaft 214, and is wound around the shaft 214 as the shaft is turned in a clockwise direction. Thus, as the motor 213 and shaft 214 rotate in a counterclockwise direction, the line 215 is wound around the shaft and the securing member 201, and the lines secured thereto, are pulled toward the rear of the cabinet. A reversing switch 217 is mounted within the cabinet in a position so that as the securing members 201 and 202 are pulled to the rear, the securing members will contact the reversing switch and thereby reverse the direction of rotation of the motor 213 and the shaft 214. Thus when the securing member 201 contacts the reversing switch 217, the direction of rotation of the motor and the shaft are reversed and the line 216 is then wound around the shaft 214, pulling the securing member 202 to the rear. As the securing member 202 is being pulled to the rear, the securing member 201 is being pulled toward the forward end of the cabinet. The line 215 is then being unwound from the shaft 214. As the securing member 202 is pulled to the rear, this securing member contacts the reversing switch, thus reversing the direction of rotation of the motor and shaft and thereby reversing the direction of movement of the securing members 201 and 202.

As can be seen in FIGURE 12, the rear portion of the cylindrical supporting structure 209, as seen to the left in FIGURE 12, is open so that the lines which move the panel sectors of the display member 210 may be led to the rear of the cabinet 200 and attached to the rotating shaft 214 so as to move the panel sectors of the display member 210 and thereby vary the visual displays presented by the animated display device.

While certain preferred embodiments of this invention have been specifically disclosed, it is to be understood that this invention is not to be limited thereto as many variations will be readily apparent to those skilled in this art and this invention is to be given its broadest possible interpretation consistent with the prior art.

Having thus described my invention, what I claim is:

1. An animated display device which comprises housing means having an open forward end and an open rear end, a plurality of display units arranged generally in lateral sequence in the housing and cooperating to provide a pair of composite displays, one at the front and one at the rear of the housing, each of said units comprising a loop of generally flat panels hinged together in series, each panel loop having a forwardly facing display panel and a rearwardly facing display panel, said forwardly facing panels being arranged edge-to-edge with their hinged edges closely proximate each other and with the panels in generally co-planar relationship, the rearwardly facing panels being arranged edge-to-edge with their hinged edges closely proximate each other and with the panels in generally co-planar relationship, the remaining portions of the loops extending between said forwardly and rearwardly facing panels with the sides of adjacent loops closely adjacent to each other, driving means connected to the loops for shifting successive corresponding panels of the loops into generally forwardly and rearwardly facing co-planar relationships, respectively, to vary the displays, and means providing direct mechanical engagement between at least one pair of corresponding panels belonging to each adjacent pair of loops whereby the hinged panels of each loop will move in fully synchronized relationship with the panels of the adjacent loops, the panels hingedly connected within a panel loop so as to face the forward open end of said housing means having one panel fixedly attached to a member within said housing means which does not move within said housing means and another panel fixedly attached to a member within said housing means which is free to move within said housing means, and the panels hingedly connected within said panel loop so as to face the rear open end of said housing means having one panel fixedly attached to a member within said housing means which does not move within said housing means and another panel fixedly attached to a member within said housing means which is free to move within said housing means.

2. An animated display device which comprises housing means having an open forward end, a plurality of display units arranged generally in lateral sequence in the housing and cooperating to provide a composite display, each of said units comprising a loop of generally flat panels hinged together in series, each panel loop having a forwardly facing display panel, said forwardly facing panels being arranged edge-to-edge with their hinged edges closely proximate each other and with the panels in generally co-planar relationship, the remaining portions of the loops extending rearwardly from said forwardly facing panels with the sides of adjacent loops closely adjacent to each other, driving means connected to the loops for shifting successive corresponding panels of the loops into a generally co-planar, forwardly facing relationship to vary the display, and means providing direct mechanical engagement between at least one pair of corresponding panels belonging to each adjacent pair of loops whereby the hinged panels of each loop will move in fully synchronized relationship with the panels of the adjacent loops, said driving means being oscillatory, first shifting the panel loops in one direction and then shifting the panel loops in the other direction, and said driving means comprising motor means and a crankshaft driven by said motor means, said crankshaft being mechanically connected to said panel loops, adjacently disposed panel loops being separated by partition members and said partition members being alternatively movable and immovable within said housing means.

3. An animated display device in accordance with claim 2 wherein each of said movable partition members is fixedly attached to two adjacent disposed panel loops and is provided with a vertical slot in which a bearing is mounted, the bearing being provided for an arm of a crankshaft utilized for moving said movable partition member within said housing means so as to thereby move said panel loops and thus vary the display presented by said animated display device.

4. An animated display device which comprises housing means having an open forward end, a plurality of display units arranged generally in lateral sequence in the housing and cooperating to provide a composite display, each of said units comprising a loop of generally flat panels hinged together in series, each panel loop having a forwardly facing display panel, said forwardly facing panels being arranged edge-to-edge with their hinged edges closely proximate each other and with the panels in generally co-planar relationship, the remaining portions of the loops extending rearwardly from said forwardly facing panels with the sides of adjacent loops closely adjacent to each other, driving means connected to the loops for shifting successive corresponding panels of the loops into a generally co-planar, forwardly facing relationship to vary the display, and means providing direct mechanical engagement between at least one pair of corresponding panels belonging to each adjacent pair of loops whereby the hinged panels of each loop will move in fully synchronized relationship with the panels of the adjacent loops, said driving means being oscillatory, first shifting the panel loops in one direction and then shifting the panel loops in the other direction, and said driving means comprising motor means and a crankshaft driven by said motor means, said crankshaft being mechanically connected to said panel loops, adjacent panel loops in the display device being connected to a common partition member having an elongated slot therein, a crank arm of said crankshaft being engaged in said slot in the partition member so that rotation of said crank arm applies oscillatory translational movement to the partition member and to the panel loops attached to the partition member.

References Cited by the Examiner

UNITED STATES PATENTS 843,889   2/1907   Gilman et al. _____ 40—32

FOREIGN PATENTS 476,822   6/1915   France.
665,960   5/1929   France.
856,122   11/1952  Germany.
501,966   11/1954  Italy.

EUGENE R. CAPOZIO, *Primary Examiner.*

JEROME SCHNALL, CHARLES LAWRENCE,
*Examiners.*

JOHN WILL, WILLIAM GRIEB, *Assistant Examiners.*